(12) United States Patent
Montemurro et al.

(10) Patent No.: US 10,313,860 B2
(45) Date of Patent: Jun. 4, 2019

(54) METHOD AND SYSTEM FOR WAKEUP TRIGGER BY OUT-OF-BAND COMMUNICATION

(71) Applicant: BlackBerry Limited, Waterloo (CA)

(72) Inventors: Michael Peter Montemurro, Toronto (CA); James Randolph Winter Lepp, Ottawa (CA); Stephen McCann, Southampton (GB)

(73) Assignee: BlackBerry Limited, Waterloo, CA (US)

( * ) Notice: Subject to any disclaimer, the term of this patent is extended or adjusted under 35 U.S.C. 154(b) by 23 days.

(21) Appl. No.: 15/448,100

(22) Filed: Mar. 2, 2017

(65) Prior Publication Data
US 2018/0255422 A1    Sep. 6, 2018

(51) Int. Cl.
*H04W 52/02*    (2009.01)
*H04W 4/80*    (2018.01)
(Continued)

(52) U.S. Cl.
CPC ......... *H04W 4/80* (2018.02); *H04W 36/0061* (2013.01); *H04W 36/18* (2013.01); *H04W 36/30* (2013.01); *H04W 52/0212* (2013.01); *H04W 52/0235* (2013.01); *H04W 76/15* (2018.02); *H04W 84/12* (2013.01); *H04W 88/06* (2013.01); *Y02D 70/00* (2018.01); *Y02D 70/10* (2018.01); *Y02D 70/14* (2018.01); *Y02D 70/142* (2018.01);
(Continued)

(58) Field of Classification Search
CPC ......... H04W 52/0206; H04W 52/0216; H04W 74/085; H04W 88/06; H04W 52/0235; H04W 4/80; H04W 76/15; H04W 4/008; H04W 36/0061; H04W 36/18; H04W 36/30; H04W 52/0212; H04W 76/025; H04W 84/12; H04W 8/005; H04W 52/0274; H04W 52/0229; H04W 52/0238; H04W 52/028; H04W 52/02; H04W 88/10
See application file for complete search history.

(56) References Cited

U.S. PATENT DOCUMENTS 7,299,009 B2 * 11/2007 Hussmann ........ H04W 52/0232
455/41.2
8,111,677 B2 * 2/2012 Wentink ................ H04W 48/10
370/338
(Continued)

OTHER PUBLICATIONS

International Search Authority, International Search Report for Application No. PCT/CA2018/050141, dated Mar. 2, 2017.
(Continued)

*Primary Examiner* — Wutchung Chu
(74) *Attorney, Agent, or Firm* — Moffat & Co (57) ABSTRACT

A method at a wireless station for receiving an out-of-band wakeup trigger, the method including receiving, at the wireless station, a message from an access point, the message providing an indication that the access point supports out-of-band signaling; associating with the access point over a first radio technology; establishing a connection with the access point using a second radio technology; entering a sleep state for a radio using the first radio technology; and upon receiving a wakeup trigger over the connection using the second radio technology, waking up the radio for the first radio technology for communication with the access point.

23 Claims, 6 Drawing Sheets

(51) Int. Cl.
*H04W 36/18* (2009.01)
*H04W 36/30* (2009.01)
*H04W 36/00* (2009.01)
*H04W 76/15* (2018.01)
*H04W 84/12* (2009.01)
*H04W 88/06* (2009.01)

(52) U.S. Cl.
CPC .......... *Y02D 70/144* (2018.01); *Y02D 70/146* (2018.01); *Y02D 70/162* (2018.01); *Y02D 70/166* (2018.01); *Y02D 70/22* (2018.01)

(56) References Cited

U.S. PATENT DOCUMENTS

| | | | |
|---|---|---|---|
| 8,934,387 B2 | 1/2015 | He et al. | |
| 9,408,105 B2 | 8/2016 | Luna | |
| 9,730,162 B2* | 8/2017 | Pujari | H04W 52/0235 |
| 9,801,226 B2* | 10/2017 | Kasher | H04W 76/18 |
| 9,955,333 B2* | 4/2018 | Benoit | H04W 8/005 |
| 2004/0259542 A1* | 12/2004 | Viitamaki | H04L 12/12 |
| | | | 455/426.2 |
| 2006/0221917 A1* | 10/2006 | McRae | H04W 88/06 |
| | | | 370/338 |
| 2006/0262739 A1* | 11/2006 | Ramirez | H04W 88/06 |
| | | | 370/311 |
| 2008/0176521 A1* | 7/2008 | Singh | H04W 52/287 |
| | | | 455/69 |
| 2008/0181155 A1* | 7/2008 | Sherman | H04W 52/0229 |
| | | | 370/311 |
| 2009/0137206 A1* | 5/2009 | Sherman | H04W 16/14 |
| | | | 455/41.2 |
| 2010/0097969 A1 | 4/2010 | De Kimpe et al. | |
| 2011/0274021 A1* | 11/2011 | He | H04W 52/0238 |
| | | | 370/311 |
| 2012/0046025 A1* | 2/2012 | Das | H04W 48/08 |
| | | | 455/422.1 |
| 2012/0115471 A1* | 5/2012 | Awoniyi | H04W 52/0206 |
| | | | 455/435.1 |
| 2012/0322466 A1* | 12/2012 | Das | H04W 8/005 |
| | | | 455/458 |
| 2014/0269309 A1* | 9/2014 | Lee | H04W 52/0235 |
| | | | 370/235 |
| 2014/0281623 A1* | 9/2014 | Zhang | G06F 1/3234 |
| | | | 713/323 |
| 2015/0120336 A1* | 4/2015 | Grokop | B60W 40/09 |
| | | | 705/4 |
| 2015/0131650 A1* | 5/2015 | Shuman | H04L 65/80 |
| | | | 370/352 |
| 2015/0189686 A1* | 7/2015 | Kasher | H04W 76/18 |
| | | | 455/41.2 |
| 2015/0208349 A1* | 7/2015 | Ramamurthy | H04W 52/0212 |
| | | | 370/311 |
| 2015/0312857 A1* | 10/2015 | Kim | H04W 52/0222 |
| | | | 370/311 |
| 2015/0381830 A1* | 12/2015 | Wu | H04N 21/41407 |
| | | | 348/207.1 |
| 2016/0057605 A1* | 2/2016 | Shellhammer | H04W 8/005 |
| | | | 370/311 |
| 2016/0066274 A1* | 3/2016 | Pujari | H04W 52/0235 |
| | | | 370/311 |
| 2016/0174288 A1 | 6/2016 | Backholm et al. | |
| 2016/0219408 A1* | 7/2016 | Yang | H04W 52/0241 |
| 2016/0246344 A1* | 8/2016 | Slavin | G06F 9/4411 |
| 2016/0360489 A1* | 12/2016 | Boodannavar | H04B 7/0413 |
| 2016/0381638 A1 | 12/2016 | Min et al. | |
| 2017/0026819 A1* | 1/2017 | Xue | H04W 8/005 |
| 2017/0026907 A1 | 1/2017 | Min et al. | |
| 2017/0164416 A1* | 6/2017 | Yeddala | H04W 36/30 |
| 2017/0181199 A1* | 6/2017 | Agarwal | H04W 4/80 |
| 2017/0237817 A1* | 8/2017 | Sharma | H04L 67/02 |
| | | | 370/331 |
| 2018/0027490 A1* | 1/2018 | Liu | G08C 17/02 |
| | | | 370/311 |
| 2018/0091962 A1* | 3/2018 | Hernandez | H04W 4/90 |
| 2018/0110000 A1* | 4/2018 | Shellhammer | H04W 52/0206 |
| 2018/0184435 A1* | 6/2018 | Cariou | H04W 52/0203 |

OTHER PUBLICATIONS

Shih et al., "A Long-Range Directional Wake-Up Radio for Wireless Mobile Networks", Journal of Sensor and Actuator Networks, 2015.
Oller et al., "IEEE 802.11-enabled wake-up radio system: design and performance evaluation", Electronics Letters, vol. 50, No. 20, pp. 1484-1486, published Sep. 25, 2014.
Demirkol et al., "Wake-up Receivers for Wireless Sensor Networks: Benefits and Challenges", IEEE Wireless Communications, Aug. 2009.

\* cited by examiner

| Element ID 310 | Length 312 | Wake-up Radio Capabilities 314 |
|---|---|---|

Octets:   1          1          1

| B0 | B1 | B2 | B3   B6 | B7 |
|---|---|---|---|---|
| Wake-up Radio enabled 412 | BLE Beacon enabled 414 | AP Sleep State 416 | AP Sleep State count 418 | Reserved 420 |

Bits:   1          1          1          4          1

| B0 | B1 | B2 | B3   B6 | B7 |
|---|---|---|---|---|
| Wake-up Radio enabled 612 | BLE Beacon enabled 614 | AP Sleep State 616 | AP Sleep State count 618 | WUR BSS Transition 620 |

Bits:   1          1          1          4          1

METHOD AND SYSTEM FOR WAKEUP TRIGGER BY OUT-OF-BAND COMMUNICATION

FIELD OF THE DISCLOSURE

The present disclosure relates to wireless local area network (WLAN) technology and in particular relates to WLAN technology having reduced latency and power consumption.

BACKGROUND

One of the challenges with using WLAN technology, for example for Internet of Things (IoT) communications, is balancing network connectivity with battery conservation. If a WLAN radio is always on for a wireless station (STA), then there is low latency in exchanging data, but power consumption can be significant. This may be problematic for battery powered wireless stations.

Conversely, the radio can be turned off for a duty cycle to reduce power consumption. However, the longer the radio is off, the higher the latency. In particular, in communications with longer duty cycles, often the wireless station does not communicate with an access point (AP) for an extended period, making it impossible to transmit data from the AP to the wireless station. This may be problematic for wireless stations that need data with low latency.

Further, with the radio being off for a long period, associations between the STA and AP may be lost, and the overhead of establishing or maintaining network connectivity with that access point could be a key contributor to power consumption.

BRIEF DESCRIPTION OF THE DRAWINGS

The present disclosure will be better understood with reference to the drawings, in which.

DETAILED DESCRIPTION OF THE DRAWINGS

The present disclosure provides a method at a wireless station for receiving an out-of-band wakeup trigger, the method comprising: receiving, at the wireless station, a message from an access point, the message providing an indication that the access point supports out-of-band signaling; associating with the access point over a first radio technology; establishing a connection with the access point using a second radio technology; entering a sleep state for a radio using the first radio technology; and upon receiving a wakeup trigger over the connection using the second radio technology, waking up the radio for the first radio technology for communication with the access point.

The present disclosure further provides a wireless station configured for receiving an out-of-band wakeup trigger, the wireless station comprising: a processor; and a communications subsystem, wherein the wireless station is configured to: receive a message from an access point, the message providing an indication that the access point supports out-of-band signaling; associate with the access point over a first radio technology; establish a connection with the access point using a second radio technology; enter a sleep state for a radio using the first radio technology; and upon receiving a wakeup trigger over the connection using the second radio technology, wake up the radio for the first radio technology for communication with the access point.

The present disclosure further provides a computer readable medium for storing program instructions for receiving an out-of-band wakeup trigger, the program instructions, when executed by a processor of a wireless station, cause the wireless station to: receive a message from an access point, the message providing an indication that the access point supports out-of-band signaling; associate with the access point over a first radio technology; establish a connection with the access point using a second radio technology; enter a sleep state for a radio using the first radio technology; and upon receiving a wakeup trigger over the connection using the second radio technology, wake up the radio for the first radio technology for communication with the access point.

The present disclosure further provides a method at an access point, the method comprising: transmitting, from the access point, a message, the message providing an indication that the access point supports out-of-band signaling; associating the access point with at least one wireless station over a first radio technology, the associating comprising receiving an indication that the at least one wireless station supports out-of-band signaling; establishing a connection with the at least one wireless station to the access point using a second radio technology; receiving an indication that the at least one wireless station is entering a sleep state for a radio using the first radio technology; receiving data for the at least one wireless station; buffering the data; sending a wakeup trigger over the connection using the second radio technology; receiving a signal over the first radio technology that the at least one wireless station is awake; and sending the buffered data to the at least one wireless station using the first radio technology.

Current power-saving techniques applied to WLAN technology typically sacrifice latency for power consumption. IoT devices may, in some embodiments, be battery powered and therefore have limited power. In this regard, it is desirable to have lower power consumption communications while maintaining low latency communications.

One WLAN technology that is used for illustrative purposes in the present disclosure is the Institute of Electrical and Electronics Engineers (IEEE) 802.11 standard. In some embodiments this standard is also known as Wi-Fi. However, the 802.11 standard is only provided as an example, and other WLAN technologies are possible.

Numerous power saving techniques are defined in the IEEE 802.11 standard. However, these rely on legacy physical or medium access control (MAC) layer behaviors. These behaviors require a device, while connected, to remain synchronized with the peer device or Access Point. This is done by waking up to receive beacon frames, which are transmitted periodically. For example, in one embodiment the beacon frames may be transmitted every several hundred milliseconds.

Thus, under the IEEE 802.11 standard, an STA has the capability to operate in one of two power states: Doze and Awake. In the Doze state, the STA has the capability of turning off its radio for a predetermined amount of time. Signaling in the WLAN operating channel allows STAs to communicate their current power-save state. However, by turning off the radio for a specific amount of time, latency is introduced for communications in the network. Specifically, download communications to the STA will need to wait until the STA next wakes up (e.g. enters the Awake state).

In another power savings technique, a device that infrequently communicates with the network may disconnect from the network, but is required to discover, authenticate, and associate to a network before resuming communications. Such device may be unreachable for downlink communications while disconnected.

Specifically, for applications that involve longer duty cycles, the device may periodically associate to a network to communicate information and then disassociate with the network after communication is complete. However, the power consumption overhead of associating and disassociating to an access point can exceed the power consumption in communicating with the network. Thus the power optimization comes at a cost of the overhead of connecting and disconnecting, as well as the latency introduced for downlink communications, which can only be pushed when the device comes back on line.

Other techniques, including unscheduled automatic power-save delivery (U-APSD), basic service set (BSS) Max Idle Period Management, and Directed Multicast Service, also optimize power at a cost of high latency for downlink traffic.

All of these techniques consume power and introduce latency.

Further, in instances where mobility is required, when using the above power saving techniques the STA may move out of range of the AP while in a Doze state or not communicating with the network. The STA may move between APs as it travels around.

By moving out of range, the STA will need to rediscover a new AP when it wakes up (e.g. enters the Awake state) and fails to receive a beacon from the AP it was originally connected to. This can both increase power consumption and latency.

Thus, in accordance with the embodiments of the present disclosure, an out-of-band trigger is provided for a wakeup signal to a WLAN radio. The out-of-band signal is transmitted using a low power radio communication. In one embodiment the low power radio communication has similar transmission distance to the WLAN but with lower power consumption. Examples of such out-of-band radio technologies may include, but are not limited to, Bluetooth™ Low Energy (BLE), IEEE 802.15 technology including Zig-Bee™, among other options. The low power out-of-band communication is described below using Bluetooth Low Energy for illustration purposes, but the present disclosure is not limited to that particular technology.

In the embodiments described below, the state machines of the low power out-of-band communications and the WLAN are linked to allow the WLAN state machine to remain "associated" even when the WLAN radio is turned off and in a Sleep state.

Figure 1:
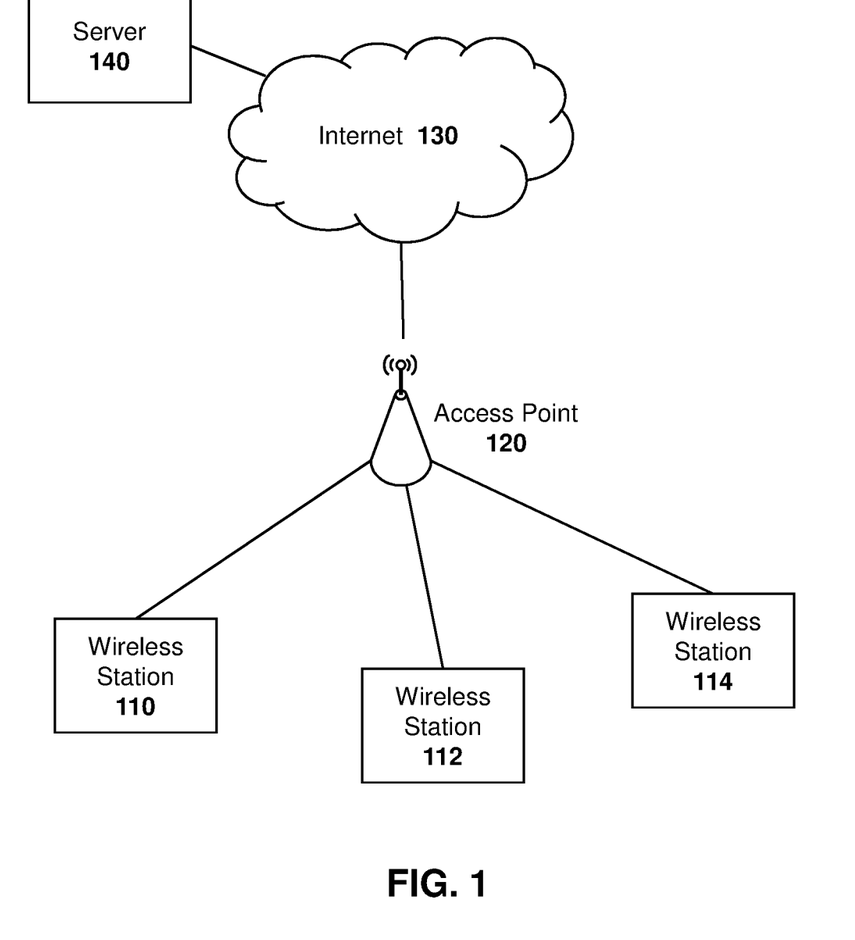
FIG. 1 is a block diagram showing an example network architecture with a single access point.

Reference is now made to FIG. 1, which shows an example environment for the operation of an access point and various wireless stations. The stations may be either mobile or fixed.

In particular, the example of FIG. 1 shows wireless stations 110, 112, and 114. In many cases, stations 110, 112 and 114 may be battery operated, and therefore have limited power resources.

In one embodiment, wireless stations 110, 112 and 114 can be any device capable of connecting to an access point 120. In other embodiments, wireless stations can connect to each other, for example in independent BSS (IBSS) networks or mesh networks. Examples can include mobile devices such as smartphones or cellular telephones. Examples can further include fixed or mobile devices, such as internet of things devices, home automation devices, medical equipment in hospital or home environments, inventory tracking devices, environmental monitoring devices, energy management devices, infrastructure management devices, vehicles or devices for vehicles, fixed electronic devices, among others.

Wireless stations 110, 112 and 114 connect to an access point 120. Access point 120 may then connect, for example, through the internet 130 to one or more servers 140. Servers 140 may, for example, store data or provide coordination for one or more of stations 110, 112 and 114.

The architecture of FIG. 1 is merely an example of one simplified architecture. Other architectures are within the scope of the present disclosure.

In most WLAN solutions presently, both wireless stations 110, 112 or 114, as well as access point 120, are built using hardware that has Bluetooth™ capabilities. The solutions presented herein therefore leverage Bluetooth™ low energy radio and protocols for signaling for wakeup radio.

Figure 2:
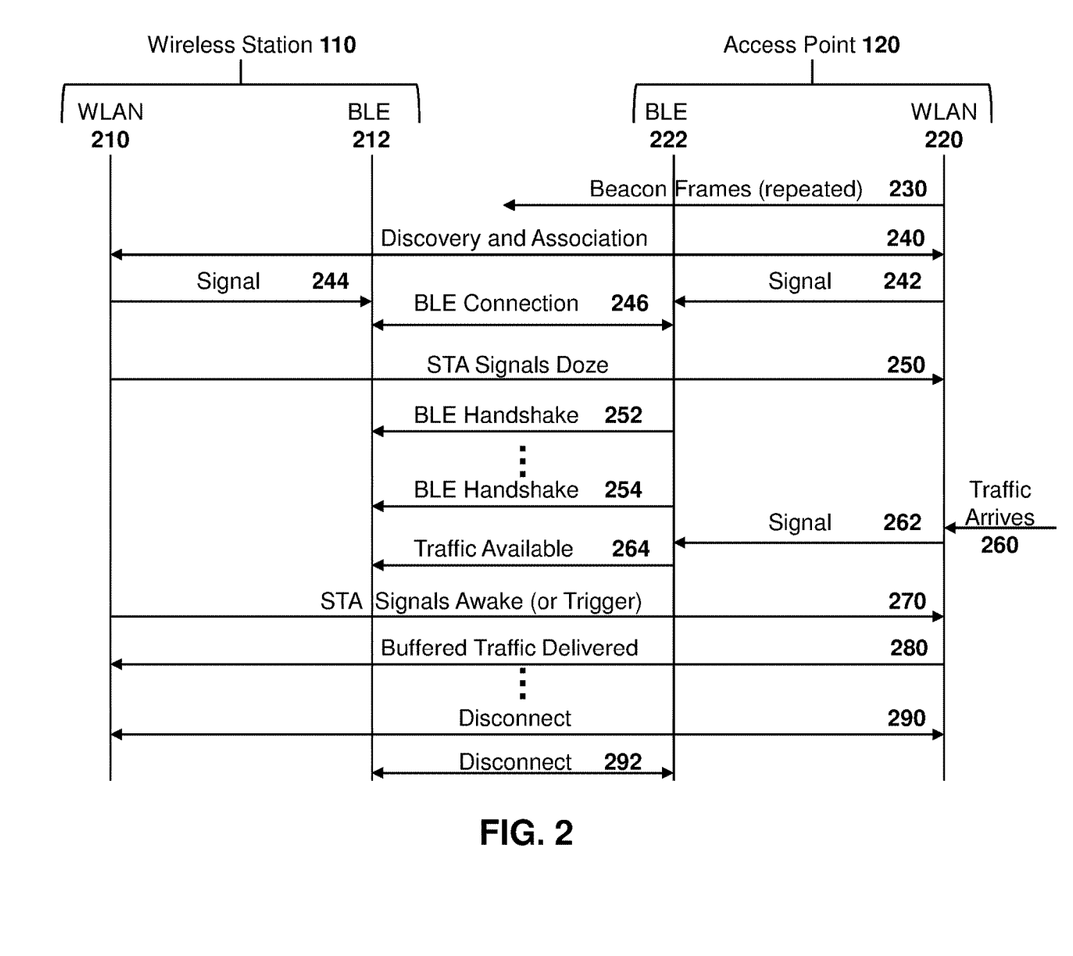
FIG. 2 is a data flow diagram showing communications between a wireless station and an access point, where each has an out-of-band radio.

Reference is now made to FIG. 2, which shows a data flow diagram for communications between a wireless station and an access point. Each of the wireless station and access point have a second, low energy radio for transmission of beacon information for the first radio technology and for use as wakeup radio.

In particular, a wireless station 110 communicates with an access point 120. Wireless station 110 includes a first radio technology radio, which in the example of FIG. 2 is a WLAN radio 210. Wireless station 110 further includes a second radio technology radio, which in the example of FIG. 2 is a Bluetooth™ Low Energy radio 212.

Similarly, access point 120 includes first and second radio access technology radios, which in the example of FIG. 2 include a WLAN radio 220 and a Bluetooth™ Low Energy radio 222.

Prior to any association between the wireless station 110 and the access point 120, the access point is transmitting repeated beacon frames, shown by message 230.

When station 110 receives a beacon frame 230, it may initiate a discovery and association procedure, as shown by arrow 240 in the embodiment of FIG. 2.

In accordance with the present disclosure, the wireless station 110 is configured for wakeup radio (WUR) using out-of-band communications and therefore may be referred to as a WUR-STA.

In one or both of the beacon frame 230 or in probe response frames sent during the association procedure shown at arrow 240, the AP may advertise wakeup radio capabilities. A wakeup radio non-AP STA (WUR-STA) that recognizes these AP capabilities, may associate to the AP asserting its own wakeup radio capabilities.

For example, an STA, including AP or non-AP STAs, may communicate its WUR capabilities with other STAs using a wakeup radio element in an 802.11 management frame. The wakeup radio element is transmitted by a wakeup radio STA, for example in a probe request, an association request, a re-association request and/or a generic advertisement service (GAS) frame such as an access network query protocol (ANQP) frame.

The wakeup radio element is transmitted by an AP in the beacon, probe response, association response, re-association response and/or ANQP frame.

Figure 3:
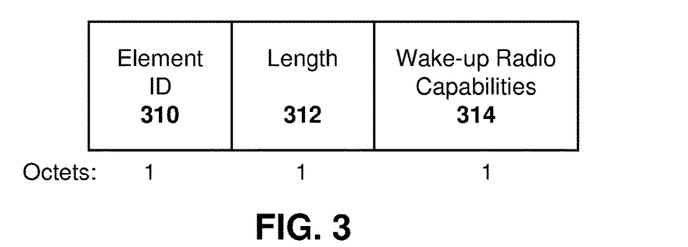
FIG. 3 is a block diagram of an example wakeup radio element for use in a management frame.

Reference is now made to FIG. 3, which shows an example wakeup radio element. In the example of FIG. 3, a wakeup radio element includes three octets. A first octet 310 provides an element identifier. A second octet 312 provides a length and a third octet 314 provides wakeup radio capabilities.

The element identifier field 310 is set to the wakeup radio capabilities element value or an equivalent WUR ANQP-element information identifier.

The link element field 312 is set to the length of the element (3 octets).

Figure 4:
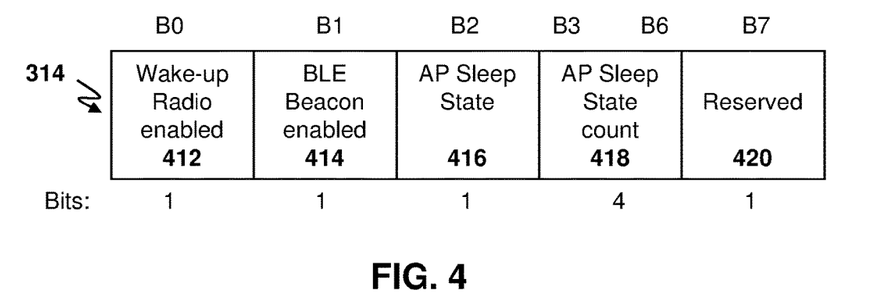
FIG. 4 is a block diagram of an example wakeup radio capabilities field within the wakeup radio element of FIG. 3.

The wakeup radio capabilities field 314 may, for example, be an element as described in FIG. 4. Specifically, the wakeup radio capabilities field 314 is a single octet which includes a plurality of bit fields.

A first bit field is a wakeup radio enabled bit field 412, which in the example of FIG. 4 is a single bit. The wakeup radio enabled bit indicates that wakeup radio features are enabled on the STA.

Octet 314 further includes a Bluetooth™ Low Energy beacon enabled field 414. Field 414, when set to one on a STA, indicates that the STA supports Bluetooth low energy for wakeup radio.

An AP Sleep state field 416 in octet 314 comprises a single bit which is set to one by an AP if the AP is capable of moving into a Sleep state. This bit would be set to a zero by a WUR STA.

In the example of FIG. 4, the next four bits in octet 314 include the AP Sleep state count field 418. If the bit in field 416 is set to 1, then the value provided in field 418 indicates the number of Target Beacon Transmission Time (TBTT) intervals that an AP will remain in the Awake state before transitioning to a Sleep state. The AP Sleep state count field is updated on each beacon transmission until the AP enters the Sleep state. If the AP remains awake, the AP Sleep state count field is set to 0. Further, in the case of an STA-STA connection, the STA in a non-infrastructure connection could use the AP Sleep state count field 418 to indicate when it will enter the Sleep state.

The remaining bit field 420 is a single reserved bit.

Thus, wake-up radio capabilities for both the AP and WUR STA can be provided in either or both of the beacon frames 230 and during discovery and association 240.

Referring again to FIG. 2, in parallel with associating to the AP, (or following the association to the AP), the WUR STA discovers and establishes a BLE connection to the AP in one embodiment. In some cases, BLE discovery could also be achieved or facilitated using WLAN frames. For example, BLE discovery information such as the Bluetooth™ MAC address of the AP may be exchanged using WLAN frames at the time of the association.

Once the WUR-STA associates to the AP 120, the WUR-STA and the AP may also negotiate out-of-band signaling using the Bluetooth™ Low Energy. In one embodiment the WLAN association request/response from arrow 240 may include information for the out-of-band signaling.

As described below, the BLE connection is used to synchronize the WUR STA with the AP while the WUR STA is in a WLAN Sleep state. The Sleep state is defined as a new state in IEEE 802.11 which is only supported on WUR STAs when WUR is enabled. The Sleep state is different from the Doze and Awake states currently defined in IEEE 802.11.

Thus, in FIG. 2, if the AP BLE 222 radio is off, the AP 120 may enable its BLE radio through a signal 242. The BLE radio 222 may for example be off if wireless station 110 is the first WUR-STA that associates with the AP 120.

Similarly, the if the BLE radio 212 on station 110 is off, it may be enabled using a signal 244.

Subsequently, a BLE connection 246 may be established. The AP 120 enables the BLE General Access Profile (GAP) as described below, and begins to broadcast BLE beacon frames and responses to BLE scan request frames.

Upon successful BLE connection, the station 110 may signal that it is going into a Sleep state, as shown by arrow 250. Specifically, in one embodiment station 110 uses a unicast frame to signal to AP 120 a state transition from either the Awake or Doze state to the Sleep state. Such unicast frame could be a data frame, control frame or management frame in various embodiments The WUR STA remains synchronized with the AP over the BLE link. Specifically, BLE handshakes 252 and 254 could be used to provide beacon information for the WLAN over the BLE connection. The BLE handshakes can continue periodically while the devices are connected but the WLAN radio 210 is turned off.

Under certain conditions, the AP may send an Open Systems Interconnection (OSI) layer 2 or layer 3 signaling, such as Address Resolution Protocol (ARP), Dynamic Host Configuration Protocol (DHCP), or possibly multicast Domain Name System (mDNS), or other similar information over the Bluetooth link.

The STAs use the active BLE connection when at least the STA is in the Sleep state. When a trigger condition arises, such as a reception of a frame for the WUR-STA at the AP or a condition that requires the WUR STA to move to an Awake state, either the AP or the STA notifies its peer over the BLE link to trigger a transition from the Sleep state to an Awake state. The STAs may then resume communications while in the Awake state.

As seen in FIG. 2, a trigger condition arises with traffic arrival 260 at the AP 120. The traffic arrival 260 may trigger the WLAN radio 220, which then signals to the BLE radio, 222 as shown by message 262.

For example, the AP may receive such traffic from a cellular network in a mobile hotspot, or over Ethernet/cable/DSL/fiber backhaul, among other options. The frame that is received may be addressed to one of the associated WUR STAs.

The BLE radio 222 may then signal to the station 110 that the traffic is available, as shown by message 264.

The station 110 then transitions from the Sleep to Doze state over the IEEE 802.11 link and signals to the AP to deliver the frame. Specifically, the station 110 may, utilizing its WLAN radio 210, signal to the WLAN radio 220 of access point 120 that it is an Awake or Doze state. This is shown, for example, by message 270.

Upon the station 110 awaking its WLAN radio 210, any buffered traffic at the access point 120 may be delivered, as shown by message 280.

For uplink traffic from station 110 to AP 120, when the station 110 has data to communicate it may also provide a message directly from the WLAN radio 210 to the access point 120, assuming that the access point is awake. Thus, if the access point is in an Awake state, BLE connection signaling may not be needed for uplink traffic.

Subsequently, if station 110 and access point 120 remain associated then a transition may either be made back to the Bluetooth wakeup radio. For example, after a threshold time period after the last buffered data is delivered, the wireless station 110 may again send message 250 to move into a Sleep state.

In other embodiments, a disconnection may occur between the station 110 and access point 120. For example, this may occur is the station and AP move out of range of each other. Such disconnection is shown, for example, in the embodiment of FIG. 2 with arrows 290 and 292 showing disconnection of the WLAN radio and the Bluetooth™ radio respectfully.

AP Sleep State

While the embodiments described below deal with the AP moving into and out of a Sleep state, in other embodiments, such as for IBSS or mesh networks, the functionality described below could be used for non-infrastructure STAs as well.

In some embodiments, it may be desirable for an AP to move into a Sleep state and turn off its WLAN radio. Communication with wireless stations could still be made using a BLE radio, as described above. For example, if the AP is a battery operated device, it may wish to conserve battery power.

Figure 5:
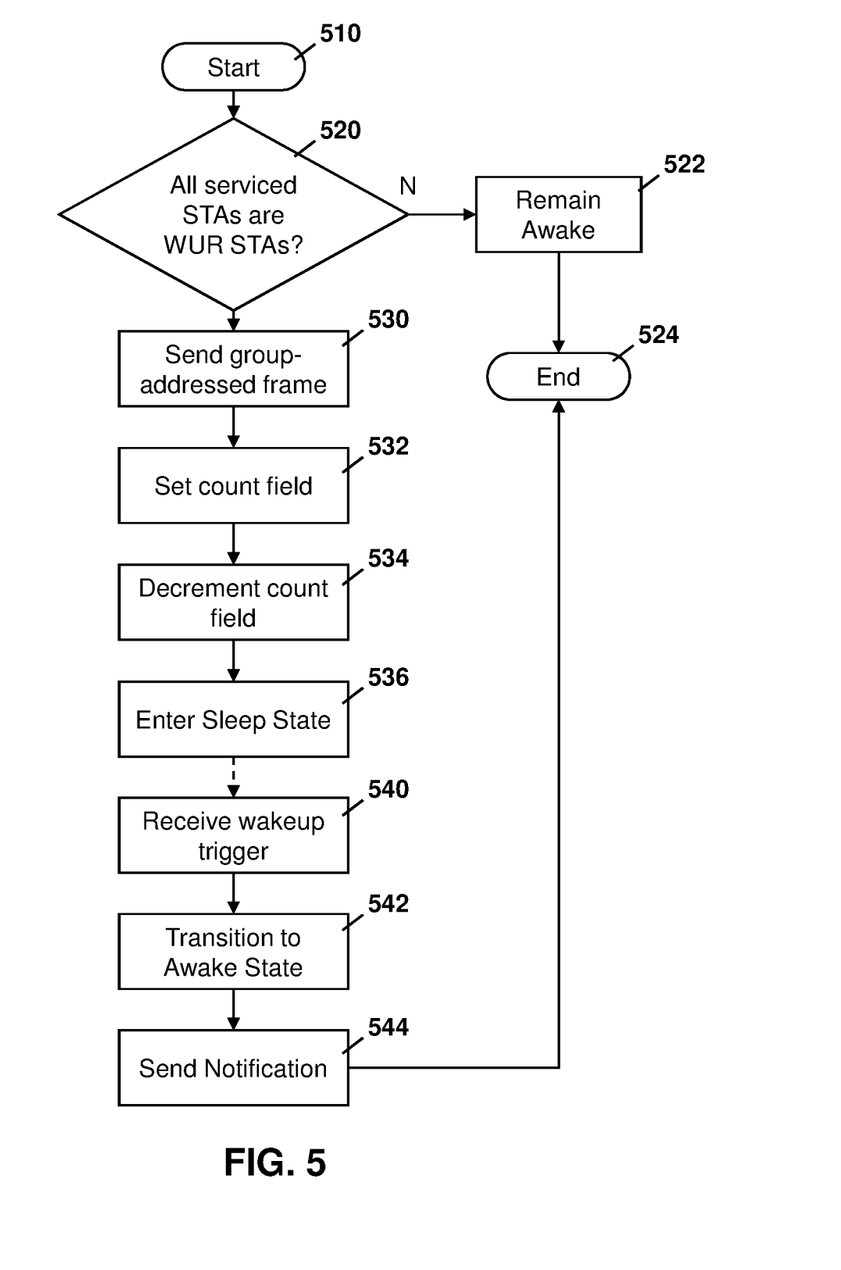
FIG. 5 is a block diagram showing a process for an access point to enter and leave a Sleep state.

Reference is now made to FIG. 5, which shows a process at an AP for transitioning to a Sleep state and an Awake state.

The process of FIG. 5 starts at block 510 and proceeds to block 520 in which a check is made to determine whether all STAs serviced by the AP are WUR-STAs. If not, the process remains in an Awake state, as shown by block 522, and the process ends at block 524.

Conversely, if the access point is going to sleep and all of the stations that it services are WUR STAs, then the AP may use a group-addressed frame to signal the state transition from the Awake to the Sleep state, shown by block 530. Such group addressed frame could include management, data or control frames.

The signaling could be done in a number of ways. In a first embodiment, the signal may define a new control frame to signal the state change.

In a further embodiment, the signaling uses a frame control field to signal the state change in either a data frame or a management frame. For example, this may be done by setting both the Power-save (PS) bit field and the More Data bit field to 1 in the same frame.

In still a further embodiment, a new management frame may be defined or a new format to the Quality of Service (QoS) Null data or Null data frame may be used to signal the state change.

After successfully transmitting the frame, the AP sets the AP Sleep state count field to the number of TBTTs before entering the Sleep state, as shown by block 532. The AP decrements the AP Sleep state count field in block 534 and enters Sleep state at block 536 once the count decrements from 1.

During the Sleep state, the AP maintains all BSS states and properties.

The access point may monitor the Sleep state of the associated WUR STAs and remain synchronized.

A trigger condition exists as shown at block 540, for example, when traffic needs to be sent or received. The AP may transition to an Awake state, shown at block 542, and send a notification at block 544 over the BLE link triggering the STAs WLAN radio to wake up. The AP continues to buffer traffic until the STA wakes up.

When the AP transitions from a Sleep state to an Awake state, it resumes beacon frames and treats associated WUR STAs as if they are in a Doze state.

In some embodiments, the AP may transition from a Sleep state to an Awake state in response to an associated WUR STA sending a trigger to wake up using the BLE. This would occur when the STA has a frame to transmit to the AP.

The AP may also transition from the Sleep state to the Awake state in response to receiving a frame from the backhaul network. For example, the AP may receive such traffic from a cellular network in a mobile hotspot, or over ethernet/cable/DSL/fiber backhaul, among other options. The frame that is received may be addressed to one of the associated WUR STAs. In this case the AP wakes up and subsequently sends the trigger frame over the BLE to wake up the WUR STA. The WUR STA then transitions from the Sleep to Doze state over the IEEE 802.11 link and signals to the AP to deliver the frame.

In other cases, trigger conditions may be other event based triggers. For example, if a door is opened, a motion sensor is tripped in a home alarm system and the AP or STA may need to move from a Sleep to an Awake State. In other examples, a time of day may be a trigger. Other options are possible.

Under certain conditions, the AP may send an OSI layer 2 or layer 3 signaling, such as Address Resolution Protocol (ARP), Dynamic Host Configuration Protocol (DHCP), or possibly multicast Domain Name System (mDNS), or other similar information over the Bluetooth link.

For a WUR-STA interacting with the AP, the WUR STA may monitor the Awake state of the AP until it receives a group-addressed trigger frame indicating that the AP is going into a Sleep state. The WUR STA then monitors the AP Sleep state count and enters the Sleep state when the AP enters the Sleep state. During the Sleep state, the WUR STA maintains synchronization with the AP using the BLE link. When triggering to resume BSS communications, the WUR STA transitions from a Sleep state to a Doze state, and then sends a power-save trigger frame to the AP to resume communications.

Under certain conditions, the STA may send OSI layer 2 or layer 3 signaling, such as ARP, DHCP, or possibly mDNS, or other similar information over the WUR link.

Bluetooth™ Behavior

With regard to the Bluetooth™ functionality in the above-described embodiments, in one example the WUR STA behaves as a scanner for Bluetooth™ functionality and the AP behaves as the advertiser. If two WUR STAs are communicating, the STAs could negotiate which one becomes the scanner, or the determination could be made based on a generated intent value, MAC address value, among other options.

The combined connection process, in one embodiment is as follows.

First, the WUR STA may discover and Associate to the AP over WLAN.

Next, the AP enables BLE Beacons advertising WUR connectivity.

Next, the WUR STA scans for the AP over BLE after it successfully associates.

The WUR STA then discovers the AP over the BLE and initiates a BLE connection.

The WUR STA and the AP then maintain the BLE connection while the WUR STA is in its Sleep state.

When buffered frames are available, at least two mechanisms are available to advertise the buffered frames to the WUR STA. In a first embodiment, the AP may use an indication in the BLE Beacon to the WUR STA which would trigger the WUR STA to wake-up. This may be used, for example, in non-latency sensitive embodiments. When the WUR STA receives the trigger that there is buffered traffic, it may resume communication over the WLAN after a period of time after receiving the BLE Beacons in order to receive non-latency sensitive data.

In a further embodiment, the AP may send a BLE Data frame to the WUR STA to trigger the STA to resume communications over the WLAN link. In this embodiment, the WUR STA may resume communications over WLAN immediately in response to the BLE Data frame.

In accordance with one embodiment of the present disclosure, the Bluetooth low energy uses a General Access Profile (GAP) to control advertisement and connectivity. The WUR STA acts as a peripheral device while the access point access is a central device. As will be appreciated by those in the art, the GAP defines the general topology of the BLE network stack.

Further, a General Attributes Profile (GATT) is defined to allow the AP infrastructure and the WUR STA to exchange information over the BLE link. In accordance with the Bluetooth™ specifications, a General Attributes Profile (GATT) describes a use case, roles and general behaviors based on GATT functionalities. Services are collections of characteristics and relationships to other services that encapsulate the behavior of part of a device. GATT data is used to define the way that two Bluetooth low energy devices send and receive standard messages.

In the present embodiments, the GATT profile defines the advertisement for Bluetooth low energy service discovery, and defines signaling for WUR over the BLE link between the devices.

The WUR STA associates to a WLAN AP over the WLAN link and searches for the same AP over Bluetooth by scanning for the WLAN AP corresponding BLE beacon. Once the BLE beacon has been discovered, the WUR STA then establishes a connection to the AP over BLE, using the WUR GATT profile in one embodiment. Alternatively, an existing profile with data customized to support WUR may be used.

The STA discovers and connects to the AP over the BLE link through the AP advertising the service instance for notifications in BLE beacons, along with a combination of the Basic Service Set Identification (BSSID), Service Set Identification (SSID), or any other identifier included in the WUR information over the WLAN.

Further, the WUR STA receiving the advertisement then may establish a BLE connection. The WLAN Association identifier may be included in the connection in one example.

Once the STA has connected to the AP over BLE, they exchange information such as power-save state information, WLAN link synchronization information such as Beacon timing, and further may exchange signaling information to indicate when traffic is buffered for the STA on the WLAN network.

The GATT profile defined above may either be newly created or may use an existing GATT profile. For example, the any of the following GATT profiles may be used.

A first GATT profile that may be used is the Alert Notification Service. In this case Alert notifications would be used to trigger WLAN radio data exchanges. The AP sends an alert to the device when there is data to be received.

A further GATT profile that may be used is the Transport Discovery Service. Attribute Protocol (ATT) Indication frames could be used to trigger notifications.

When data traffic exchange is required over the WLAN link, the AP sends a notification to the WUR STA using BLE and the WUR STA wakes up on the WLAN radio to resume communications.

In one embodiment, the AP and WUR STA exchange the following information over the BLE connection.

When the WUR STA connects to the AP, the AP sends a data frame at a negotiated interval. The AP includes the IEEE 802.11 Timing Synchronization Function (TSF) Timer value and the Beacon Offset in each data frame exchanged with the WUR STA. This allows the device to remain synchronized with the BSS.

Further, at regular intervals, the WUR STA may send an indication of the IEEE 802.11 Sleep state. The indication can also be exchanged over the BLE regardless of the WLAN power save state, in order for the WUR STA to synchronize its state with the AP. A new parameter can be defined which can transmit the current power safe state of the WUR STA and the AP. This parameter can have the values Sleep, Awake or Doze.

Further, at regular intervals, the WUR STA and the AP may exchange OSI layer 2 or layer 3 related information such as ARP, mDNS packets among other information to maintain the layer 2, layer 3 connectivity while in the Sleep state using BLE.

When there is buffered traffic available for the WUR STA, the AP may set a buffered traffic field to a 1, for example, in one embodiment. In other embodiments, there may be two values depending on whether the traffic is latency sensitive or not.

The WUR STA uses the TSF Timer and Offset to align its wake up on the WLAN connection. The AP uses its Sleep state information to ensure that the WUR STA power save state is synchronized at the 802.11 layer.

The process of waking up on the WLAN typically involves turning on the WLAN radio hardware if it is able to power off and performing a Carrier Sense Multiple Access (CSMA) channel check on the channel the AP is operating on before it went to sleep. The STA would, in one embodiment, exit the Sleep state into a Doze state, and listen on the WLAN network. The STA could use information available in the Bluetooth Beacon to predict the next WLAN beacon transmission. The WUR STA may then transmit a PS-Poll or QoS Null-data frame to the AP to indicate that it is available.

BSS Transition

When a WUR STA is moving in relation to the access point, at some point it may move out of range of the access point. In prior solutions, this would mean dropping the connection and reestablishing a connection to a new access point based on discovery at the WLAN.

In accordance with the present embodiments, the WUR STA, when in the Sleep state, may monitor the link quality of the BLE connection. Once the link quality of the BLE connection falls below a link quality threshold, the BLE client, which is the WUR STA, may then periodically scan for BLE beacons from other Access Points. If the WUR STA discovers a BLE beacon having a better signal quality than a threshold, the WUR STA may transition the WLAN radio from a Doze to an Awake state to trigger an IEEE 802.11 scan and perform BSS Discovery on the WLAN. The WUR STA may then potentially perform a BSS Transition to the new AP.

To minimize the power consumption on the WLAN radio for the WUR STA, the BLE beacon information may include the AP BSSID, operating channel information, and potentially the SSID, Mobility Domain, and Homogeneous Extended Service Set Identifier (HESSID) to identify the network.

The above assumes that in a multi-AP network all of the APs are transmitting a BLE beacon.

The WUR STA may signal to the current AP to indicate that it is in the process of transitioning to a target AP. The WUR STA and current AP maintain communications over the BLE connection while the WUR STA is transitioning to the target AP.

When the WUR STA selects the target AP, it resumes WLAN communication by transitioning from the Sleep state to the Awake state, and associates with the target AP. Once the WUR STA has successfully associated with the target AP, it establishes a new BLE connection to the target AP, and it may drop its BLE connection to the current AP.

Regarding AP behavior, when a WUR BSS Transition is enabled, APs in a multi-AP network may advertise the WUR BSS Transition capabilities in WLAN Beacons. This could be done using an Extended Capability bit or could be added to the Wake-up Radio Capabilities, as shown with regard to FIG. 6.

Figure 6:
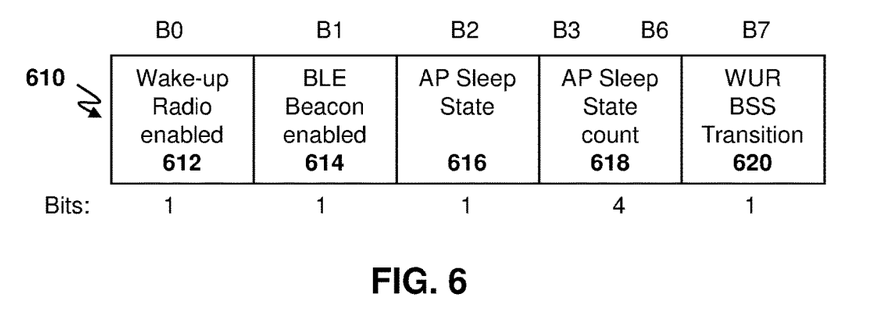
FIG. 6 is a block diagram of an example wakeup radio capabilities field within the wakeup radio element of FIG. 3 having a base service set (BSS) transition bit.

Specifically, as seen in FIG. 6, an octet 610 is provided for wake up radio capabilities. Specifically, as seen in FIG. 6, octet 610 includes a first bit 612 which indicates whether or not wake up radio is enabled.

A second bit 614 may indicate BLE beacon enabled.

A third bit 616 may indicate the AP Sleep state.

The next four bits may provide a field 618 showing the AP sleep state count as described above with regard to FIG. 3.

The final bit may provide a WUR BSS transition field 620. Bit 620 may be used to indicate the transition capabilities. Specifically, WUR APs with the BSS transition enabled continually transmit BLE beacons. The APs are configured so that their Bluetooth radio has roughly the same coverage pattern as the WLAN radio. This allows the WUR STA to discover new APs while in its Sleep state.

Regarding the WUR station, while in its Sleep state it may both monitor the BLE link to the current AP and periodically scan for discovery of target APs over the BLE medium. The WUR STA maintains a list of candidate target APs.

When the signal quality of the BLE link to the current AP falls and causes a trigger condition to BSS transition, the WUR may select a candidate target AP based on BLE scan results. The station may wakeup the IEEE 802.11 radio to verify the WLAN Received Signal Strength Indication (RSSI) for the target AP.

The station then wakes up to the WLAN radio on the operating channel specified in target AP BLE beacon and associates to the target AP.

The current AP, in one embodiment, may also suggest a candidate target AP to the WUR STA. For example, this may be done by using a neighbor report transmission from the AP to the WUR STA.

During the process of association, the WUR STA may terminate its BLE connection to the current AP. This could occur at any time during the association process with the target AP. Once the WUR STA has successfully associated, it establishes a BLE connection with the target AP as described above with regard to the BLE association.

As will be appreciated, the above provides for mobile devices or other stations to optimize power consumption while minimizing communication latency. Specifically, BLE radio is significantly more power efficient that WLAN radio but its use still provides for fast transition in to a communications mode on the WLAN radio.

The above solution further provides for a wake up radio that could be used on hardware that exists in the field today.

The modules and devices, including the WUR STAs and access points, described above may be any computing device or network node. One simplified diagram of a computing device is shown with regard to FIG. 7.

Figure 7:
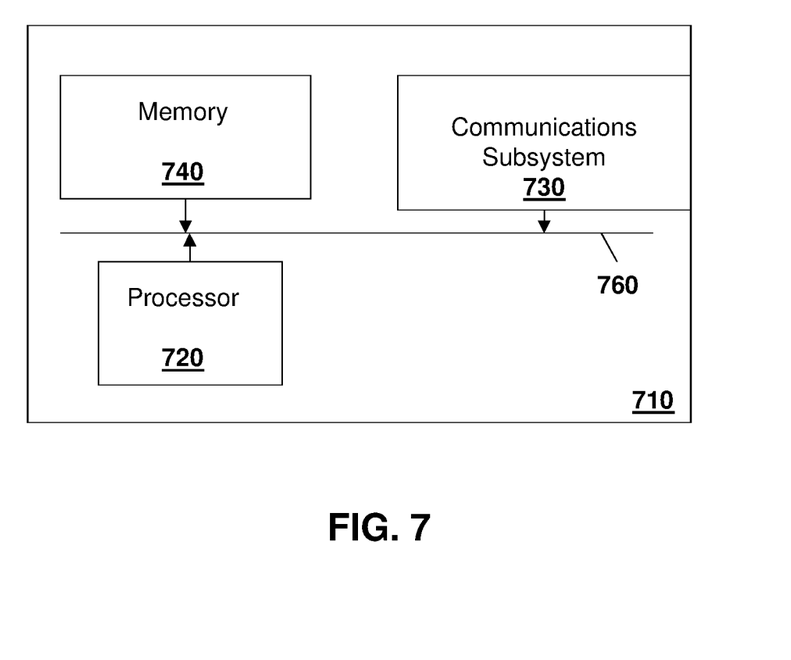
FIG. 7 is a block diagram of a simplified electronic device capable of being used with the methods and systems herein according to one embodiment.

In FIG. 7, device 710 includes a processor 720 and a communications subsystem 730, where the processor 720 and communications subsystem 730 cooperate to perform the methods of the embodiments described above.

Processor 720 is configured to execute programmable logic, which may be stored, along with data, on device 710, and shown in the example of FIG. 7 as memory 740. Memory 740 can be any tangible, non-transitory computer readable storage medium. The computer readable storage medium may be a tangible or in transitory/non-transitory medium such as optical (e.g., CD, DVD, etc.), magnetic (e.g., tape), flash drive, hard drive, or other memory known in the art.

Alternatively, or in addition to memory 740, device 710 may access data or programmable logic from an external storage medium, for example through communications subsystem 730.

Communications subsystem 730 allows device 710 to communicate with other devices or network elements. If device 710 is an access point or wireless station, communications subsystem 730 includes both a WLAN radio and a low power radio such as BLE.

Communications between the various elements of device 710 may be through an internal bus 760 in one embodiment. However, other forms of communication are possible.

Further, if any of computing devices 110, 112, 114, 120, or 140 are mobile devices, one example device is described below with regard to FIG. 8.

Mobile device 800 may comprise a two-way wireless communication device having voice or data communication capabilities or both. Mobile device 800 generally has the capability to communicate with other computer systems on the Internet. Depending on the exact functionality provided, the mobile device may be referred to as a data messaging device, a two-way pager, a wireless e-mail device, a cellular telephone with data messaging capabilities, a wireless Internet appliance, a wireless device, a user equipment, or a data communication device, as examples.

Where mobile device 800 is enabled for two-way communication, it may incorporate a communication subsystem 811, including a receiver 812 and a transmitter 814, as well as associated components such as one or more antenna elements 816 and 818, local oscillators (LOs) 813, and a processing module such as a digital signal processor (DSP) 820. As will be apparent to those skilled in the field of communications, the particular design of the communication subsystem 811 will be dependent upon the communication network in which the device is intended to operate.

Network access requirements will also vary depending upon the type of network 819. In some networks network access is associated with a subscriber or user of mobile device 800. A mobile device may require a removable user identity module (RUIM) or a subscriber identity module (SIM) card in order to operate on a network. The SIM/RUIM interface 844 is normally similar to a card-slot into which a SIM/RUIM card can be inserted and ejected. The SIM/RUIM card can have memory and hold many key configurations 851, and other information 853 such as identification, and subscriber related information. Without a SIM card, the mobile device may still be capable of limited functionality, including placing an emergency call.

When required network registration or activation procedures have been completed, mobile device 800 may send and receive communication signals over the network 819. As illustrated in FIG. 8, network 819 can include multiple base stations communicating with the mobile device.

Signals received by antenna 816 through communication network 819 are input to receiver 812, which may perform such common receiver functions as signal amplification, frequency down conversion, filtering, channel selection and the like. Analog to digital (A/D) conversion of a received signal allows more complex communication functions such as demodulation and decoding to be performed in the DSP 820. In a similar manner, signals to be transmitted are processed, including modulation and encoding for example, by DSP 820 and input to transmitter 814 for digital to analog (D/A) conversion, frequency up conversion, filtering, amplification and transmission over the communication network 819 via antenna 818. DSP 820 not only processes communication signals, but also provides for receiver and transmitter control. For example, the gains applied to communication signals in receiver 812 and transmitter 814 may be adaptively controlled through automatic gain control algorithms implemented in DSP 820.

Mobile device 800 generally includes a processor 838 which controls the overall operation of the device. Communication functions, including data and voice communications, are performed through communication subsystem 811. Processor 838 also interacts with further device subsystems such as the display 822, flash memory 824, random access memory (RAM) 826, auxiliary input/output (I/O) subsystems 828, serial port 830, one or more keyboards or keypads 832, speaker 834, microphone 836, other communication subsystem 840 such as a short-range communications subsystem and any other device subsystems generally designated as 842. Serial port 830 could include a USB port or other port known to those in the art.

Figure 8:
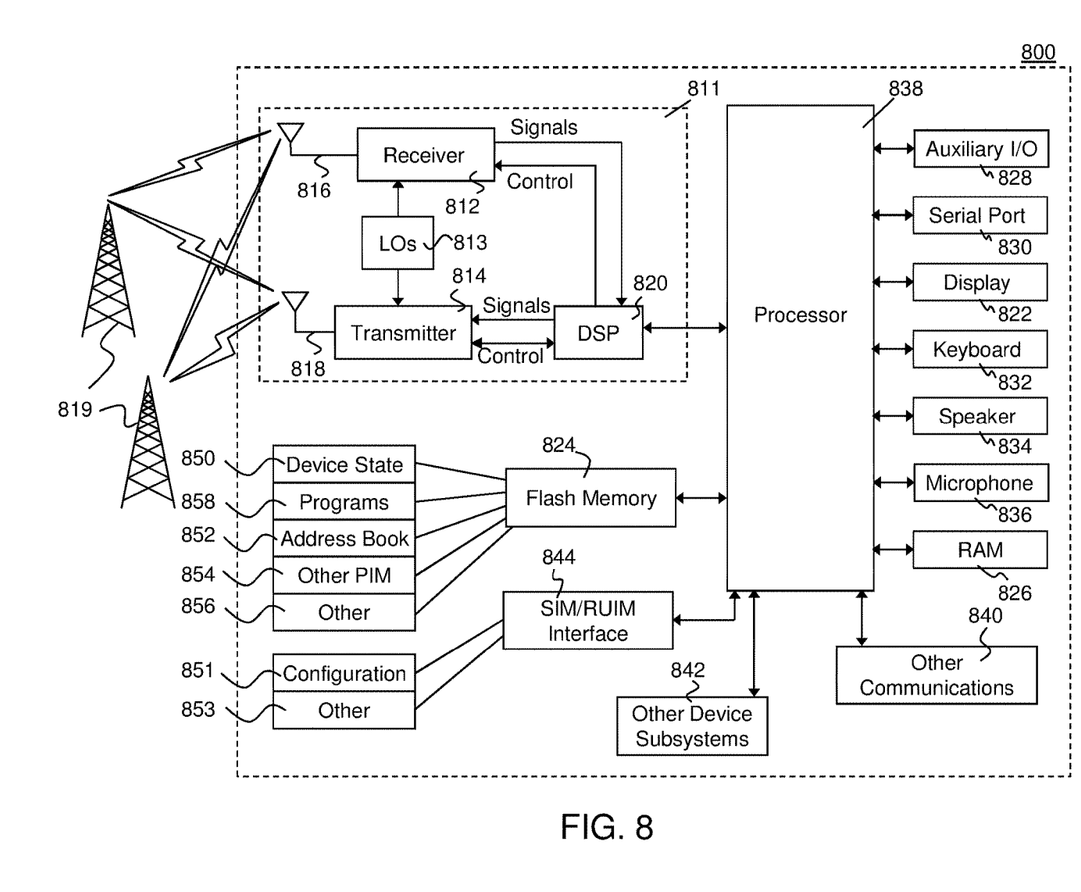
FIG. 8 is a block diagram of a mobile device according to one embodiment.

Some of the subsystems shown in FIG. 8 perform communication-related functions, whereas other subsystems may provide "resident" or on-device functions. Notably, some subsystems, such as keyboard 832 and display 822, for example, may be used for both communication-related functions, such as entering a text message for transmission over a communication network, and device-resident functions such as a calculator or task list.

Operating system software used by the processor 838 may be stored in a persistent store such as flash memory 824, which may instead be a read-only memory (ROM) or similar storage element (not shown). Those skilled in the art will appreciate that the operating system, specific device applications, or parts thereof, may be temporarily loaded into a volatile memory such as RAM 826. Received communication signals may also be stored in RAM 826.

As shown, flash memory 824 can be segregated into different areas for both computer programs 858 and program data storage 850, 852, 854 and 856. These different storage types indicate that each program can allocate a portion of flash memory 824 for their own data storage requirements. Processor 838, in addition to its operating system functions, may enable execution of software applications on the mobile device. A predetermined set of applications that control basic operations, including at least data and voice communication applications for example, will normally be installed on mobile device 800 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the mobile device such as, but not limited to, e-mail, messages, calendar events, voice mails, appointments, and task items. Further applications, including productivity applications, social media applications, games, among others, may also be loaded onto the mobile device 800 through the network 819, an auxiliary I/O subsystem 828, serial port 830, short-range communications subsystem 840 or any other suitable subsystem 842, and installed by a user in the RAM 826 or a non-volatile store (not shown) for execution by the processor 838. Such flexibility in application installation increases the functionality of the device and may provide enhanced on-device functions, communication-related functions, or both. A further software application with higher privilege level includes a device administrator module as described above.

In a data communication mode, a received signal such as a text message or web page download will be processed by the communication subsystem 811 and input to the processor 838, which may further process the received signal for output to the display 822, or alternatively to an auxiliary I/O device 828.

A user of mobile device 800 may also compose data items such as messages for example, using the keyboard 832, which may be a complete alphanumeric keyboard or telephone-type keypad, either physical or virtual, among others, in conjunction with the display 822 and possibly an auxiliary I/O device 828. Such composed items may then be transmitted over a communication network through the communication subsystem 811.

Where voice communications are provided, overall operation of mobile device 800 is similar, except that received signals may typically be output to a speaker 834 and signals for transmission may be generated by a microphone 836. Alternative voice or audio I/O subsystems, such as a voice message recording subsystem, may also be implemented on mobile device 800. Although voice or audio signal output is preferably accomplished primarily through the speaker 834, display 822 may also be used to provide an indication of the identity of a calling party, the duration of a voice call, or other voice call related information for example.

Serial port 830 in FIG. 8 may be implemented in a mobile device for which synchronization with a user's desktop computer (not shown) may be desirable, but is an optional device component. Such a port 830 may enable a user to set preferences through an external device or software application and may extend the capabilities of mobile device 800 by providing for information or software downloads to mobile device 800 other than through a wireless communication network. As will be appreciated by those skilled in the art, serial port 830 can further be used to connect the mobile device to a computer to act as a modem or for charging a battery on the mobile device.

Other communications subsystems 840, such as a short-range communications subsystem, is a further component which may provide for communication between mobile device 800 and different systems or devices, which need not necessarily be similar devices. For example, the subsystem 840 may include an infrared device and associated circuits and components or a Bluetooth™ or Bluetooth™ Low Energy communication module to provide for communication with similarly enabled systems and devices. Subsystem 840 may further include non-cellular communications such as WiFi or WiMAX, or near field communications.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

Example Clauses may Include:

AA. A method at an access point, the method comprising: transmitting, from the access point, a message, the message providing an indication that the access point supports out-of-band signaling; associating the access point with at least one wireless station over a first radio technology, the associating comprising receiving an indication that the at least one wireless station supports out-of-band signaling; establishing a connection with the at least one wireless station to the access point using a second radio technology; receiving an indication that the at least one wireless station is entering a sleep state for a radio using the first radio technology; receiving data for the at least one wireless station; buffering the data; sending a wakeup trigger over the connection using the second radio technology; receiving a signal over the first radio technology that the at least one wireless station is awake; and sending the buffered data to the at least one wireless station using the first radio technology.

BB. The method of clause AA, further comprising sending beacon information for the first radio technology over the connection using the second radio technology.

CC. The method of clause AA, wherein the second radio access technology is one of a Bluetooth™, a Bluetooth™ Low Energy and a ZigBee™ radio access technology.

DD. The method of clause AA, wherein the message from the access point is an Institute for Electrical and Electronics Engineers (IEEE) 802.11 management frame and indication being a wake up radio element within the management frame.

EE. The method of clause AA, wherein the wakeup trigger is at least one of a control frame; a frame control field setting both the Power-save (PS) bit field and the More Data bit field to one in the same frame; a management frame; or a Quality of Service (QoS) Null data frame.

FF. The method of clause BB, wherein the beacon information includes one or more of: an IEEE 802.11 Timing Synchronization Function (TSF) timer; a Beacon Offset; Address Resolution Protocol (ARP) information; or multicast Domain Name System (mDNS) information.

GG. The method of clause AA, further comprising sending to the at least one wireless station, over the connection, at least one candidate target access point.

HH. The method of clause AA, further comprising: determining that all wireless stations associated with the access point support out-of-band wakeup triggers; sending a group-addressed trigger frame to indicate the access point will enter a sleep state after a specified number of target beacon transmit times (TBTT); and after the specified number of target beacon transmit times (TBTT), entering the Sleep state.

II. An access point comprising: a processor; and a communications subsystem, wherein the access point is configured to: transmit a message, the message providing an indication that the access point supports out-of-band signaling; associate the access point with at least one wireless station over a first radio technology, the associating comprising receiving an indication that the at least one wireless station supports out-of-band signaling; establish a connection with the at least one wireless station to the access point using a second radio technology; receive an indication that the at least one wireless station is entering a sleep state for a radio using the first radio technology; receive data for the at least one wireless station; buffer the data; send a wakeup trigger over the connection using the second radio technology; receive a signal over the first radio technology that the at least one wireless station is awake; and send the buffered data to the at least one wireless station using the first radio technology.

JJ. The access point of clause II, wherein the access point is further configured to send beacon information for the first radio technology over the connection using the second radio technology.

KK. The access point of clause II, wherein the second radio access technology is one of a Bluetooth™, a Bluetooth™ Low Energy and a ZigBee™ radio access technology.

LL. The access point of clause II, wherein the message from the access point is an Institute for Electrical and Electronics Engineers (IEEE) 802.11 management frame and indication being a wake up radio element within the management frame.

MM. The access point of clause II, wherein the wakeup trigger is at least one of a control frame; a frame control field setting both the Power-save (PS) bit field and the More Data bit field to one in the same frame; a management frame; or a Quality of Service (QoS) Null data frame.

NN. The access point of clause JJ, wherein the beacon information includes one or more of: an IEEE 802.11 Timing Synchronization Function (TSF) timer; a Beacon Offset; Address Resolution Protocol (ARP) information; or multicast Domain Name System (mDNS) information.

OO. The access point of clause II, wherein the access point is further configured to send to the at least one wireless station, over the connection, at least one candidate target access point.

PP. The access point of clause II, wherein the access point is further configured to: determine that all wireless stations associated with the access point support out-of-band wakeup triggers; send a group-addressed trigger frame to indicate the access point will enter a sleep state after a specified number of target beacon transmit times (TBTT); and after the specified number of target beacon transmit times (TBTT), enter the Sleep state.

QQ. A computer readable medium for storing program instructions, the program instructions, when executed by a processor of an access point, cause the access point to: transmit a message, the message providing an indication that the access point supports out-of-band signaling; associate the access point with at least one wireless station over a first radio technology, the associating comprising receiving an indication that the at least one wireless station supports out-of-band signaling; establish a connection with the at least one wireless station to the access point using a second radio technology; receive an indication that the at least one wireless station is entering a sleep state for a radio using the first radio technology; receive data for the at least one wireless station; buffer the data; send a wakeup trigger over the connection using the second radio technology; receive a signal over the first radio technology that the at least one wireless station is awake; and send the buffered data to the at least one wireless station using the first radio technology.

The invention claimed is:

1. A method at a wireless station for receiving an out-of-band wakeup trigger, the method comprising:
   receiving, at the wireless station, a message from an access point, the message providing an indication that the access point supports out-of-band signaling;
   associating with the access point over a first radio technology;
   establishing a connection with the access point using a second radio technology;
   entering a sleep state for a radio using the first radio technology;
   detecting other signals for the second radio technology to maintain a list of target access points;
   upon a quality of the connection using the second radio technology falling below a threshold, waking up the radio for the first radio technology to associate with a target access point within the list of target access points; and
   upon receiving a wakeup trigger over the connection using the second radio technology, waking up the radio for the first radio technology for communication with the target access point.

2. The method of claim 1, further comprising receiving beacon information for the first radio technology over the connection using the second radio technology.

3. The method of claim 1, wherein the second radio access technology has a range similar to the first radio access technology, but with low power consumption.

4. The method of claim 3, wherein the second radio access technology is one of a Bluetooth™, a Bluetooth™ Low Energy and a ZigBee™ radio access technology.

5. The method of claim 1, wherein the message from the access point is an Institute for Electrical and Electronics Engineers (IEEE) 802.11 management frame and indication being a wake up radio element within the management frame.

6. The method of claim 2, wherein the beacon information includes one or more of: an IEEE 802.11 Timing Synchronization Function (TSF) timer value; a Beacon Offset; Address Resolution Protocol (ARP) information; or multicast Domain Name System (mDNS) information.

7. The method of claim 1, wherein the detecting further comprises receiving, over the connection, at least one candidate target access point.

8. The method of claim 1, wherein the connection to the second radio technology is maintained with the access point until the first radio technology association is established with the target access point.

9. The method of claim 1, further comprising maintaining a wherein the list of target access points is based on the based on their signal quality of each access point from the list of target access points.

10. The method of claim 9, further comprising after waking up the first radio associating with a target access point within the list of target access points.

11. The method of claim 1, wherein the association with the target access point is over the first radio technology and the method further comprises:
    establishing a second connection with the target access point using the second radio technology; and
    entering the sleep state for the radio using the first radio technology.

12. A wireless station configured for receiving an out-of-band wakeup trigger, the wireless station comprising:
    a processor; and
    a communications subsystem,
    wherein the wireless station is configured to:
       receive a message from an access point, the message providing an indication that the access point supports out-of-band signaling;
       associate with the access point over a first radio technology;
       establish a connection with the access point using a second radio technology;
       enter a sleep state for a radio using the first radio technology;
       detect other signals for the second radio technology to maintain a list of target access points;
       upon a quality of the connection using the second radio technology falling below a threshold, wake up the radio for the first radio technology to associate with a target access point within the list of target access points; and
       upon receiving a wakeup trigger over the connection using the second radio technology, wake up the radio for the first radio technology for communication with the target access point.

13. The wireless station of claim 12, wherein the wireless station is further configured to receive beacon information for the first radio technology over the connection using the second radio technology.

14. The wireless station of claim 12, wherein the second radio access technology has a range similar to the first radio access technology, but with low power consumption.

15. The wireless station of claim 14, wherein the second radio access technology is one of a Bluetooth™, a Bluetooth™ Low Energy and a ZigBee™ radio access technology.

16. The wireless station of claim 12, wherein the message from the access point is an Institute for Electrical and Electronics Engineers (IEEE) 802.11 management frame and indication being a wake up radio element within the management frame.

17. The wireless station of claim 13, wherein the beacon information includes one or more of: an IEEE 802.11 Timing Synchronization Function (TSF) timer value; a Beacon Offset; Address Resolution Protocol (ARP) information; or multicast Domain Name System (mDNS) information.

18. The wireless station of claim 12, wherein the wireless station is configured to detect by receiving, over the connection, at least one candidate target access point.

19. The wireless station of claim 12, wherein the connection to the second radio technology is maintained with the access point until the first radio technology association is established with the target access point.

20. The wireless station of claim 12, wherein the wireless station is further configured to maintain a list of target access points is based on the based on their signal quality of each target point from the list of target access points.

21. The wireless station of claim 20, wherein the wireless station is further configured to after the waking up the first radio, associate with a target access point within the list of target access points.

22. The wireless station of claim 12, wherein the wireless station is configured to:
    associate with the target access point over the first radio technology;
    establish a second connection with the target access point using the second radio technology; and
    enter the sleep state for the radio using the first radio technology.

23. A non-transitory computer readable medium for storing program instructions for receiving an out-of-band wakeup trigger, the program instructions, when executed by a processor of a wireless station, cause the wireless station to:
- receive a message from an access point, the message providing an indication that the access point supports out-of-band signaling;
- associate with the access point over a first radio technology;
- establish a connection with the access point using a second radio technology;
- enter a sleep state for a radio using the first radio technology;
- detect other signals for the second radio technology to maintain a list of target access points;
- upon a quality of the connection using the second radio technology falling below a threshold, wake up the radio for the first radio technology to associate with a target access point within the list of target access points; and
- upon receiving a wakeup trigger over the connection using the second radio technology, wake up the radio for the first radio technology for communication with the target access point.

* * * * *